Dec. 5, 1950            C. DUBOST            2,532,899
AERODYNAMIC LIFTING DEVICE
Filed Jan. 3, 1947            2 Sheets—Sheet 1
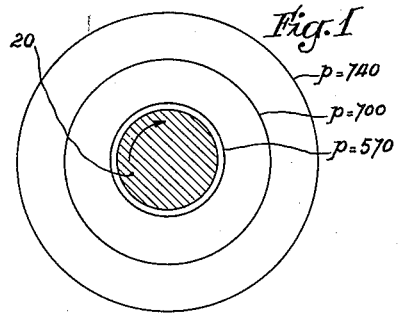
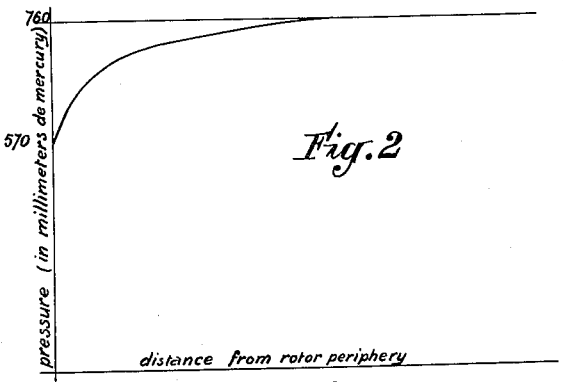
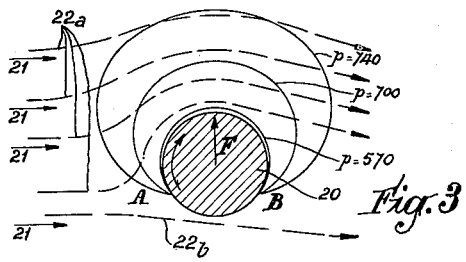
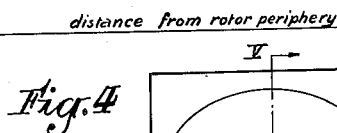
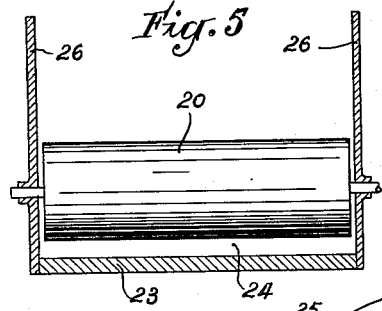
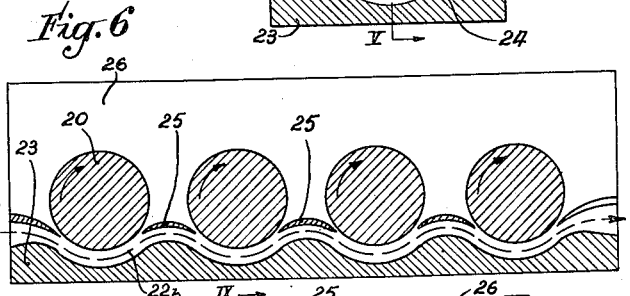
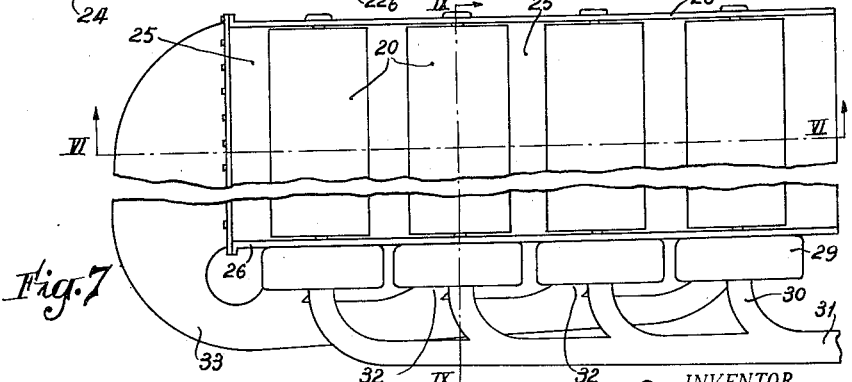
INVENTOR.
Charles Dubost
BY
ATTORNEYS Dec. 5, 1950          C. DUBOST          2,532,899
AERODYNAMIC LIFTING DEVICE
Filed Jan. 3, 1947          2 Sheets-Sheet 2
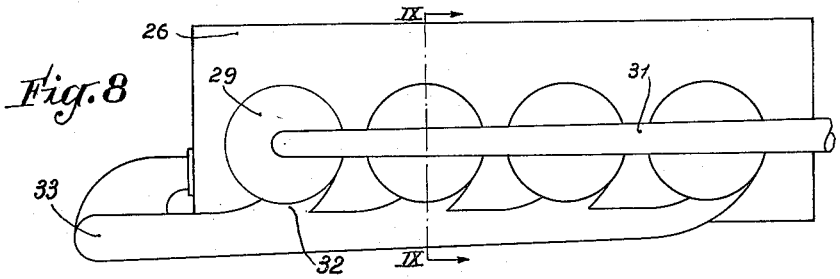
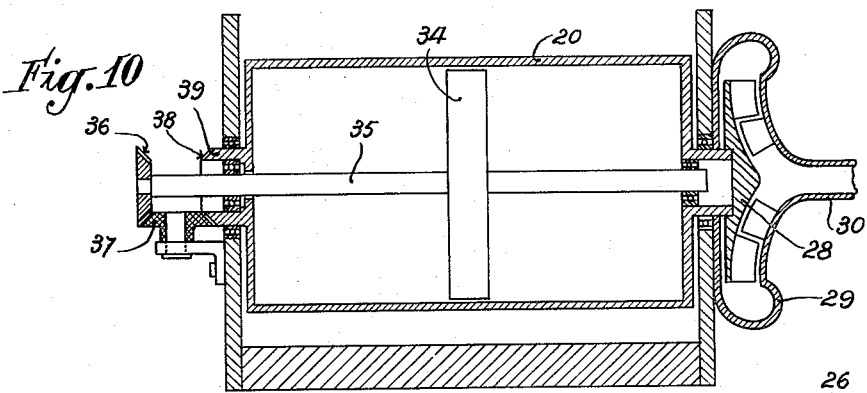
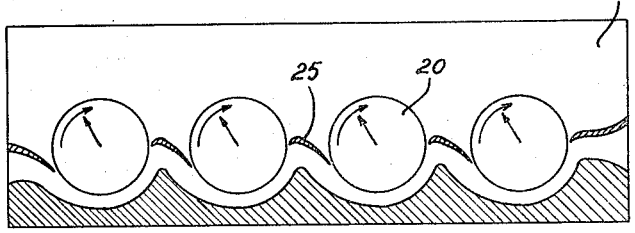
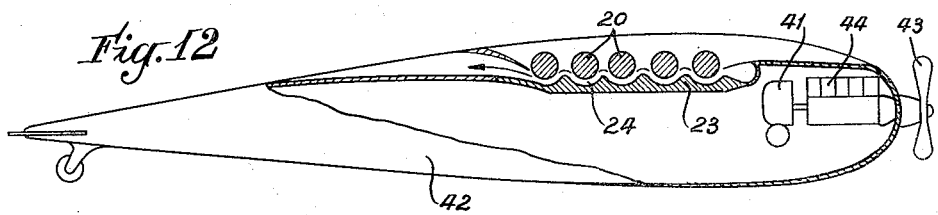
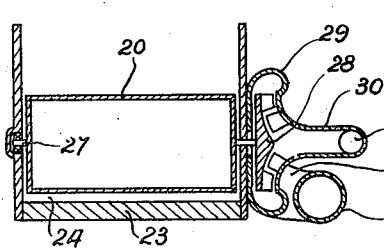
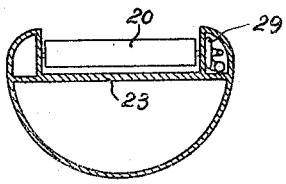

Patented Dec. 5, 1950

2,532,899

UNITED STATES PATENT OFFICE 2,532,899

AERODYNAMIC LIFTING DEVICE

Charles Dubost, Lancey, France

Application January 3, 1947, Serial No. 720,071
In France August 24, 1945

Section 1, Public Law 690, August 8, 1946
Patent expires August 24, 1965

9 Claims. (Cl. 170—1.5)

My invention relates to an aerodynamic lifting device for use in aircraft and the like.

My invention relies on what is known as the Magnus effect, that is the force resulting from rotation of a cylindrical rotor in the air.

It is known that when a cylindrical rotor is caused to rotate at high speed in a still atmosphere, there is formed a vacuum in the vicinity of the moving periphery due to the centrifugal forces acting on the air molecules induced in rotation by friction. The zones of reduced pressure thus formed are co-axial to the rotor and they therefore give rise to no resulting force on the latter. But in an air draft the speed of the air layers in the close vicinity of the rotor periphery is reduced or suppressed where the wind is opposed to the peripheral speed of the rotor and the zones of reduced pressure are no more evenly distributed around the rotor. The latter is thus submitted to a force perpendicular to the direction of the wind.

It has been proposed to use this force to propel a boat across the wind. In such a case the boat was equipped with vertical rotors. It has also been proposed to provide horizontal rotors on an aircraft, such rotors being disposed in the horizontal wind produced by a propeller. The main drawback of such arrangements is that a cylindrical rotor is a badly profiled body from an aerodynamic point of view. When it is bodily placed in an air draft there is formed a zone of impact at the front of the rotor section and a zone of eddies at the rear, which entails power losses.

It is an object of my invention to provide a rotor arrangement which will avoid these losses.

In accordance with my invention an angular portion of the zones of reduced pressure around the rotor periphery is suppressed by an air draft guided along the rotor periphery by a gutter surrounding an angular part of the latter.

Still another object of my invention is an aerodynamic device of the character above-defined, wherein the rotor is driven by a compressed gas turbine the exhaust gases of which are used to produce the air draft in the gutter surrounding the rotor.

My invention also comprises an arrangement embodying a plurality of rotors in close but non-contacting parallel relation, the said rotors being rotated at high speed in the same direction and having their lower portion surrounded by a gutter, the said gutters being connected for air flow by a series of deflectors disposed between the successive rotors to form an undulated canal wherein an air draft is blown in a direction opposed to the peripheral speed of the rotors.

Another object of my invention is an arrangement to compensate gyroscopic effects produced by each rotor, such arrangement comprising a flywheel within each rotor and rotating in opposite direction with respect to the latter.

In the annexed drawings:

Fig. 1 is a diagrammatical section of a cylindrical rotor in a still atmosphere, showing the pressure zones formed around the moving periphery.

Fig. 2 is a curve illustrating the relation between the pressure and the distance from the rotor periphery.

Fig. 3 is a diagrammatical section showing the action of an air draft on the location of the pressure zones around the rotor.

Fig. 4 is a transverse section of a rotor device in accordance with my invention.

Fig. 5 is a longitudinal section thereof.

Fig. 6 is a section of a device comprising a plurality of rotors, the plane of section being transverse to the rotors.

Fig. 7 is a plan view thereof.

Fig. 8 is a side view thereof.

Fig. 9 is a section thereof which is longitudinal with respect to the rotors.

Fig. 10 is a longitudinal section of a modification wherein there is provided a compensating flywheel within each rotor.

Fig. 11 is a transverse section of another modification providing a horizontal propelling component.

Fig. 12 is a longitudinal section of an aircraft embodying a sustaining device in accordance with my invention.

Fig. 13 is a transverse section thereof.

Referring to Fig. 1, when a cylindrical rotor 20 rotates at high speed in a still atmosphere the air layers surrounding its periphery are also rotated by the effect of friction and owing to centrifugal forces there is created a vacuum close to the rotor. Of course the rotational speed of the successive air layers decreases rapidly starting from the first layer in close contact with the rotor. Fig. 2 illustrates the variation of pressure along a radius with a rotor of 200 millimeters in diameter, rotating at a peripheral speed of 200 meters per second. Close to the rotor the air pressure is reduced to 570 (in millimeters of mercury) and it rises rapidly to reach the normal value of 760 at a relatively small distance from the rotor periphery. In Fig. 1 some lines of equal pressure (isobars) have been represented;

they are in the form of circles concentric to the rotor section.

Owing to the even distribution of pressures around the rotor periphery, the latter is submitted to no resulting force.

Of course the length of the rotor should be theoretically infinite, or its ends should be provided with appropriate baffles, since otherwise the reduction in pressure would induce longitudinal air currents which would wholly pertubate the phenomena.

In Fig. 3 the same rotor is disposed in air draft the direction of which is indicated by arrows 21. This air draft or wind decreases the speed of the air layers on one side of the rotor and on the contrary it facilitates motion of the air layers on the opposite side. The vacuum is reduced or, as shown, wholly suppressed on one side and increased on the other. The pressure lines or isobars are no more evenly distributed around the rotor and the latter is submitted to a resulting force F perpendicular to its axis. If it is assumed that the rotor axis is horizontal and that the wind or air draft 21 is also horizontal, F is a vertical force which may reach relatively high values.

The dash lines 22a and 22b in Fig. 3 illustrate the air flow lines around the rotor. At A at the front part thereof there is created a zone of impact and at the rear at B there is formed a zone of eddies. These phenomena correspond to material power losses. It may be added that the portion 22a of the air draft which passes on the upper side of the rotor is of little advantage, the increase in vacuum thus obtained being very small in actual practice with rotors rotating at high speeds. The only useful portion of the air draft corresponds to the flow lines 22b which pass in close proximity of the lower side of the rotor.

In accordance with my invention (Figs. 4 and 5) there is disposed under the rotor a gutter 23 which surrounds the lower part thereof and the air draft 22b is blown into the canal 24 formed between this gutter and the periphery of the rotor. Under such conditions the power required to create the air draft is strictly limited to the useful portion of the latter. The gutter may be disposed at a very small distance from the rotor periphery without any inconvenience, which reduces to a minimum the quantity of air to be blow per unit of time, and it is possible to provide appropriate deflectors 25 to form an inlet and an outlet for the air canal 24. The zones A and B of Fig. 3 are wholly suppressed.

Canal 24 is laterally closed by baffles 26 which extend upwardly to at the same time form end baffles for rotor 20 (Fig. 5).

The pressure of the air or other gas forced into canal 24 should of course be sufficient to overcome friction effects along the lower part of the moving periphery of the rotor. But the pressure forces thus created act upwardly and downwardly on the rotor and on the gutter and they balance each other. The only force F to which the rotor is submitted results from the vacuum zones along the upper side thereof, as in the case of Fig. 3. But the power required to create this force F is considerably reduced.

Figs. 6 to 9 diagrammatically illustrate a practical embodiment of my invention.

In order to obtain high sustaining forces without using a rotor of an abnormally high diameter I provide a plurality of smaller rotors 20 disposed parallel to each other in close non-contacting succession. Each rotor 20 has its lower portion surrounded by an arcuate gutter-shaped depression formed in the upper face of a member 23 placed below the row of rotors. There is thus formed a sort of undulated canal 24 extending along the lower portion of the successive rotors, such canal being laterally closed by fixed baffles 26 which form a supporting frame for the rotor shafts 27, as shown in Fig. 9. Deflectors 25 close the upper space between the successive rotors and at the inlet and outlet of canal 24, as illustrated in Fig. 6.

Each rotor is driven by a compressed-gas radial flow turbine comprising a disc 28 carried at the end of the rotor shaft 27 (Fig. 9) and a fixed casing 29 secured to the adjacent baffle 26. Each casing 29 has a central inlet tube 30 connected to a compressed gas line 31, and a tangential exhaust tube 32 connected to an exhaust line 33 which leads the exhaust gases into canal 24 (Fig. 7). It will be readily understood that with such an arrangement the same generator of gas under pressure ensures the drive of the individual rotors and the formation of the air draft 22b within canal 24. Such a compressed gas generator may be for instance in the form of an air compressor driven by an internal combustion engine, or it may be a free piston machine delivering exhaust gases under high pressure.

Fig. 10 illustrates a modification providing compensation of the gyroscopic effects of the rotors. In the construction each rotor 20 is in the form of a hollow body enclosing a flywheel 34 carried by a shaft 35 which is itself rotatably supported by the hollow end trunnions of the rotor 20. The turbine disc 28 is keyed on one of the end trunnions of rotor 20 while the end of shaft 25 opposed to disc 28 carries a bevel gear 36 which is connected by a fixed bevel pinion 37 with a bevel crown 38 formed at the end of the adjacent trunnion 39 of rotor 20. With such an arrangement flywheel 34 and rotor 20 rotate at the same angular speed and in opposite direction. And it will be understood that if the moment of inertia of both are equal the gyroscopic effects compensate each other, which avoids any gyroscopic torque on the craft equipped with such a device.

In the modification of Fig. 11 each deflector 25 begins substantially at the horizontal level of the axis of a rotor 20 and ends at a much lower level on the next rotor. The resulting force F on each rotor is thus somewhat oblique, as indicated, which provides a horizontal propelling component.

Figs. 12 and 13 very diagrammatically illustrate an aircraft provided with a lifting device in accordance with my invention. 44 designates the engine and 41 an air compressor driven by the latter. The rotors 20 are disposed transversely of the craft at the upper part of the fuselage 42. The air from canal 24 escapes rearwardly and its residual speed helps the propelling airscrew 43 by jet propulsion effect.

It will be understood that the above description is given merely as an example and that it does not limit the ambit of my invention. The device may comprise vanes to control the air draft.

I claim:

1. An aerodynamic lifting device for aircraft and the like, comprising a substantially cylindrical rotor adapted to rotate about a substantially horizontal axis; turbine means to rotate said rotor; a gutter surrounding the lower part of said rotor in spaced relation to the periphery thereof; and means to conduct the draft of exhaust gases from the turbine into the space between said rotor and said gutter transversely of the axis of said rotor and in a direction opposed to the peripheral speed of said rotor within said gutter.

2. An aerodynamic lifting device for aircraft and the like, comprising a substantially cylindrical rotor adapted to rotate about a substantially horizontal axis; means to rotate said rotor; a gutter surrounding the lower part of said rotor in spaced relation to the periphery thereof; and means to blow a draft of gas into the space between said rotor and said gutter transversely of the axis of said rotor and in a direction opposed to the peripheral speed of said rotor within said gutter, said means to rotate said rotor comprising a compressed gas turbine, and said means to blow a draft of gas deriving exhaust gas from said turbine.

3. An aerodynamic lifting device comprising a substantially cylindrical rotor adapted to rotate about a substantially horizontal axis, said rotor being hollow; a flywheel journaled in the hollow rotor adapted to rotate within said rotor and coaxially to the same, said flywheel having substantially the same moment of inertia as said rotor; means to rotate said rotor and said flywheel in opposed direction and substantially at the same speed; a gutter surrounding the lower part of said rotor in spaced relation to the periphery thereof; and means to blow a draft of gas into the space between said rotor and said gutter transversely of the axis of said rotor and in a direction opposed to the peripheral speed of said rotor within said gutter.

4. In an aerodynamic lifting device as claimed in claim 3, said means to rotate said rotor and said flywheel comprising a compressed gas turbine, and said means to blow a draft of gas deriving exhaust gas from said turbine.

5. In an aerodynamic lifting device as claimed in claim 3, lateral baffles adapted to close the space between said gutter and said rotor at each end of said rotor.

6. An aerodynamic lifting device for aircraft and the like comprising a plurality of substantially cylindrical rotors arranged in a row with their axes substantially parallel and horizontal, said rotors being disposed close to each other, but in spaced relation from each other; means to rotate said rotors in the same direction; gutters surrounding the lower part of said rotors in spaced relation to the periphery thereof, said gutters forming a continuous undulated partition below said rotors; deflectors inserted between the successive rotors above the corresponding gutters to form a closed gas passage between said rotors and to form a continuous undulated gas canal between said gutters and said rotors and deflectors; and means to blow a draft of gas into said continuous undulated canal transversely to the axes of said rotors and in a direction opposed to the peripheral speed of said rotors within said gutters.

7. In an aerodynamic lifting device as claimed in claim 6, lateral baffles adapted to laterally close the space between said gutters and said rotors at each end of said rotors.

8. In an aerodynamic lifting device as claimed in claim 6, said deflectors beginning substantially at the horizontal level of the axis of the preceding cylindrical rotor, in the direction of said gas draft, and terminating at a much lower point on the following rotor.

9. In an aircraft a plurality of substantially cylindrical rotors arranged in a row in parallel and close but non-contacting mutual relation; a plurality of gutters each surounding the lower part of one of said rotors in close but spaced relation to the periphery thereof; means to close the intermediate spaces between the successive rotors or gutters to form a continuous undulated canal from one end of said row of rotors to the other; lateral baffles to laterally close said undulated canal, said baffles extending upwardly in close relation to the ends of said rotors around the whole periphery of each; a compressed gas turbine to rotate each of said rotors in the same direction; means to feed said turbines with gas under pressure; and means to direct exhaust gases from said turbines into said undulated canal to form therethrough a gas draft in a direction opposed to the peripheral speed of said rotors within said gutter.

CHARLES DUBOST.

REFERENCES CITED

The following references are of record in the file of this patent:

UNITED STATES PATENTS

| Number | Name | Date |
| --- | --- | --- |
| Re. 18,122 | Flettner | July 7, 1931 |
| 1,613,834 | Jordanoff | Jan. 11, 1927 |
| 1,807,353 | Tarshis | May 26, 1931 |
| 2,039,676 | Zaparka | May 5, 1936 |
| 2,417,358 | Grose | Mar. 11, 1947 |

FOREIGN PATENTS

| Number | Country | Date |
| --- | --- | --- |
| 17,981 | Great Britain | 1915 |
| 219,664 | Great Britain | Oct. 27, 1924 |